Figure 1:
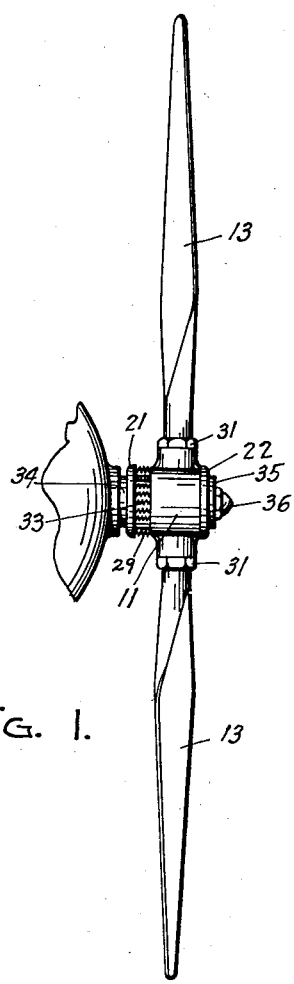

Nov. 13, 1934.   H. BATES   1,980,248
AUTOMATIC VARIABLE PITCH PROPELLER
Filed Sept. 27, 1930   2 Sheets-Sheet 1

INVENTOR.
Harrison Bates

Nov. 13, 1934.                H. BATES                1,980,248
                 AUTOMATIC VARIABLE PITCH PROPELLER
                  Filed Sept. 27, 1930        2 Sheets-Sheet 2
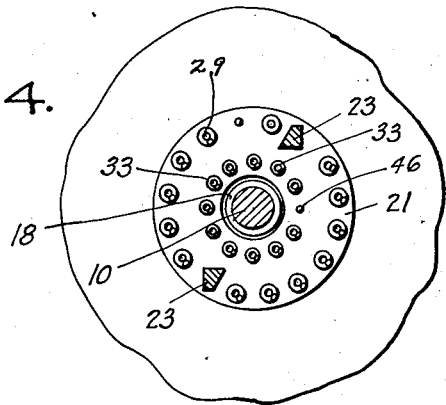
FIG. 4.
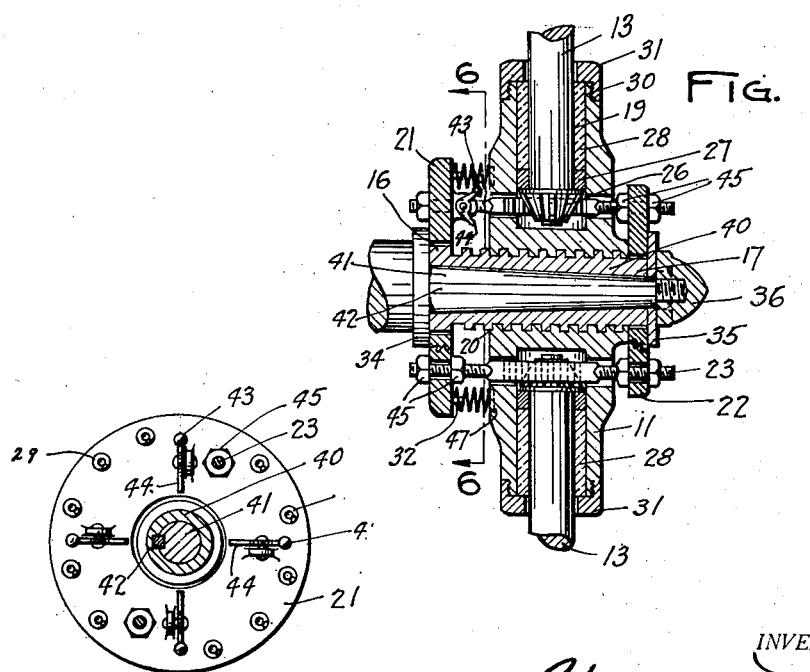
FIG. 5.
FIG. 6.
INVENTOR.

Patented Nov. 13, 1934

1,980,248

UNITED STATES PATENT OFFICE 1,980,248

AUTOMATIC VARIABLE PITCH PROPELLER

Harrison Bates, Denver, Colo., assignor to Bendix Research Corporation, East Orange, N. J., a corporation of Indiana Application September 27, 1930, Serial No. 484,738

12 Claims. (Cl. 170—162)

This invention relates to variable pitch propellers for use with aircraft and more particularly to variable pitch propellers of the automatic type.

Due to the varied atmospheric conditions under which aircraft must operate, it has been found necessary to provide propellers having means for varying the pitch of the propeller blades in order to increase the operating efficiency, also in order to quickly increase the speed of an aircraft engine to obtain its maximum power output, as in taking off, climbing, or other conditions where instant maximum engine power is desired. It is of great importance that the external load on the engine be instantly reduced and maintained at a minimum until the engine has increased its speed the desired amount. Many types of variable pitch propellers have been proposed, such as manually operated, barometrically or automatically operated. All of such types of propellers are unsatisfactory in one way or another, and fall short of providing the efficiency required for economical operation. This is due, for the most part, to the lack of synchronism and harmony between the engine and the means for varying the pitch of the propeller blades. In the case of the manually operated means for varying the pitch of propeller blades, it is obvious that the operating efficiency is limited to the guess work of the pilot and is further undesirable due to the added bulk and weight necessary to provide such a structure. In the case of the barometrically operated means for varying the pitch of the propeller blades, the operation of such means is limited to the changes of the atmosphere and lends no hand whatever in reducing the external load on the engine during taking off, climbing or the like, in order that the engine may maintain the desired revolutions. This type is also further undesirable due to the added bulk and weight necessary to provide such a structure. Other automatic means that have been proposed for varying the pitch of the propeller blades present many difficulties, and do not provide economical operation. For the most part this is due to such means not being synchronized with, or directly responsive to, the engine power. It has been proposed to vary the pitch of propeller blades by movement of the propeller hub along the propeller shaft. Such a structure is undesirable due to the shearing forces on the splines and bearings between the propeller hub and shaft which sets up considerable resistance to the movement of the hub along the shaft. Such a mechanism is inherently sluggish due to the lack of sensitiveness of the propeller hub in responding to the means for movement of the hub along the propeller shaft even when such changes occur at relatively high speeds.

It is one object of this invention to provide, in a propeller, novel means for automatically varying the pitch of propeller blades that shall overcome the above difficulties.

Another object is to provide, in a propeller, novel means for automatically varying the pitch of a propeller blade that shall be responsive to the driving torque of the propeller shaft.

Another object is to provide in a variable pitch propeller, a propeller hub adapted for relatively oscillatory and longitudinal movement with respect to the propeller shaft.

Another object is to provide novel means for automatically varying the pitch of a propeller blade that shall reduce the propeller overhang as the driving power of the propeller shaft is increased, and vice versa.

A further object is to provide novel automatic means for varying the pitch of propeller blades that shall instantly reduce the pitch of the propeller blade when the driving torque of the propeller shaft is increased and instantly increase the pitch of the said blades when the driving torque of the propeller shaft is decreased.

A further object is to provide in a variable pitch propeller having the above characteristics, means for shifting the angle through which the pitch of the blades is varied.

A further object is to provide in a variable pitch propeller having the above characteristics, novel means for connecting the propeller blades with the propeller hub.

A still further object is to provide a novel automatic variable pitch propeller wherein the forces produced in the several parts during the operation thereof, cooperate one with the other, in such a manner as to operate as a harmonious whole, whereby, maximum efficiency and economical operation are obtained.

A still further object is to provide a variable pitch propeller having the above characteristics that shall be simple in construction, rugged, durable, positive in operation, and cheap in manufacture.

The above and other objects will be apparent throughout the further description of the invention taken in connection with the accompanying drawings, wherein like reference characters refer to like parts. The drawings are more or less diagrammatic and are for the purpose of illustration only, various changes, substitutions, modifications and the like may be suggested to those skilled in the art without departing from the spirit and scope of the invention.

In the drawings—

Fig. I is an elevational view of a propeller embodying the invention.

Fig. II is an enlarged axial view taken through the propeller hub, embodying one form of the invention.

Fig. III is a sectional view taken along the line 3—3 of Fig. II.

Fig. IV is a sectional view taken along the line 4—4 in Fig. II.

Fig. V is an enlarged axial view similar to Fig. II, embodying another form of the invention, and Fig. VI is a sectional view taken along the line 6—6 of Fig. V.

Referring to the drawings, Figures I to IV inclusive, the embodiment shown comprises a propeller shaft 10, a propeller hub 11, a propeller frame 12, propeller blades 13, means 14 for oscillatory mounting of the propeller blades within the hub 11, and means 15, for varying the pitch of the propeller blades in response to the driving torque of the propeller shaft, 10.

The shaft 10 is provided at its inner end with an enlarged bearing portion 16, and at its outer end with a reduced bearing portion 17. The portion of the shaft between the said bearing portions is provided with comparatively large spiral thread 18, the pitch of which may widely vary from the apparent pitch shown, the purpose of which will hereinafter be described.

The propeller hub 11 comprises a unitary casting, having oppositely disposed openings 19 therein, for receiving the butt ends of the propeller blades 13, the internal diameters of the openings 19 being greater than the external diameter of the butt ends of the propeller blades 13 for the purpose of receiving blade retaining means hereinafter described, and an internally threaded or spiral tracked longitudinal opening 20 for receiving the threaded or spiral tracked propeller shaft 10.

The hub frame 12 comprises inner and outer end members 21 and 22 respectively, the members 21 and 22 being connected by means of diametrically disposed racks 23. The racks extend through spaced longitudinal openings 24 provided in the hub 11. Suitable bearing surfaces may be provided between the racks 23 and openings 24. The racks 23 are provided with bevelled teeth 25 positioned to mesh with bevelled pinions 26 fixed to the butt ends of the adjacent blades, the said pinions being adapted to mesh with their cooperating racks 23.

The means for oscillatorily mounting each of the blades 13 within their respective openings 19, comprises a thrust bearing 27 positioned within the openings 19 adjacent the butt end of the propeller blade 13 and resting against the outer face of the associated pinion or an enlarged portion on the blade, sleeve bearing 28 positioned within the opening 19, about the blade end and resting on the upper face of the bearing 27 or enlarged portion. The hub 11 is provided with externally threaded reduced portions 30, adapted to receive and cooperate with threaded means 31. It can be seen, therefore, that since the pinions 26 are rigidly fixed to the inner ends of the blades 13 or the pinions may be an integral part of the blades, the diameters of the outer faces of the said pinions or enlarged portions being substantially the same as the inner diameter of the openings 19, that the blades will be prevented from outward movement due to centrifugal or other forces, through the intervention of bearings 27 and 28, the said bearings being held from outward movement by the threaded means 31. This provides a structure that is rugged, durable, snug in fit, and at the same time permitting free oscillatory movement of the blades. Any suitable means of lubrication may be employed.

The means for varying the propeller pitch in response to the driving torque of the propeller shaft, comprises the spiral track or threads 18 on which the hub 11 is threaded, whereby the propeller hub is permitted limited relative oscillatory or rotary and longitudinal movement with respect to the shaft 10, the racks 23 of the propeller frame 12 meshing with the pinions 26 on the butt ends of the propeller blades, whereby upon longitudinal movement of the propeller hub the pitch of the blades is varied, yielding means 29 positioned between the inner face of member 21 and the adjacent face of the hub 11, such yielding means may consist of a plurality of springs proportioned to exert a predetermined force against the propeller hub in accordance with the driving torque of the propeller shaft and for normally maintaining the hub in its outermost position, and at which position the blades are positioned at their maximum pitch. The strength of the yielding means 29 is dependent upon the particular installation where it is employed. It can be seen, therefore, that upon applying driving torque to the shaft 10, the power necessary to drive the propeller blades will immediately be transferred to the yielding means 29, by means of the spiral track 18, cooperating with the internal track in the hub 11, i. e., upon applying driving torque to the shaft 10 the hub will immediately move rearwardly along the propeller shaft, the distance corresponding to the driving torque of the shaft 10 against the yielding means 31.

Since the pitch of the propeller blades is at its maximum when the propeller hub is in its outermost position, it will be obvious that the greater the driving torque of the propeller shaft 10, the greater the distance the hub will travel rearwardly of the shaft 10 against the yielding means 29, and decreasing the pitch of the propeller blades accordingly.

Figure 2:
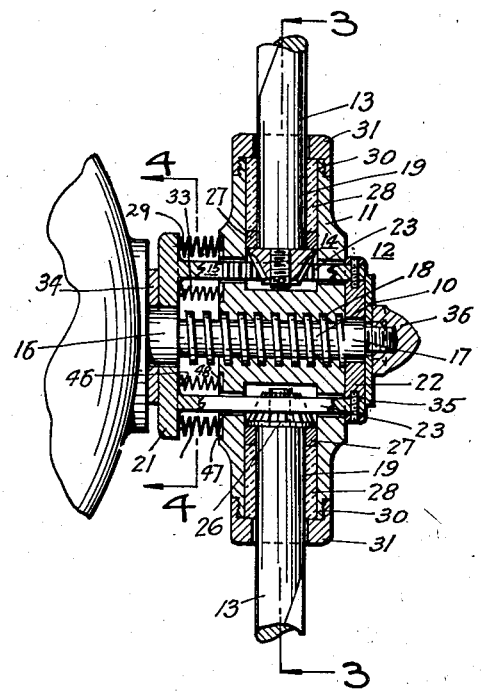
Figure 3:
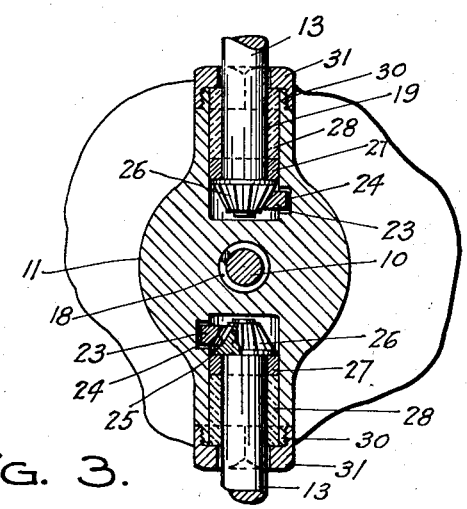

In order to obtain the above described torque-responsive movement of the hub relative to the driving shaft, the spiral track or threads 18 are of right hand pitch, as shown on Fig. 2, when it is considered that the propeller is of the tractor type and rotatable in a counterclockwise direction as viewed from the front.

Stop members 32 are provided on the outer face of member 21 for limiting the rearward longitudinal movement of the hub 11, and predetermining the minimum pitch at which the blades may operate.

Yielding means 33 is also provided and positioned between the outer face of the member 21 and the adjacent face of the propeller hub, see Fig. IV. Such yielding means 33, which may comprise a plurality of springs, are proportioned in such a manner as to exert a predetermined force against the propeller hub.

It will be noted from the drawings that the hub frame, which consists of the members 21, 22 and racks 23, is permitted relatively rotatable movement with respect to the propeller shaft 10; however, the frame 12 is prevented from longitudinal movement, and in order that the frame 12 may oscillate or rotate freely against the propeller thrust and other stresses, suitable bearings, 34 and 35, are positioned between the members 21 and 22, respectively and their adjacent cooperating parts, suitable means, such as shown at 36, is provided for maintaining the propeller frame, 12, in proper position on the propeller shaft 10, the frame 12 and its associated parts serving to limit the movement of the propeller hub 11 along the propeller shaft 10, as above described.

Figure V illustrates another embodiment of the invention, the operation of which is identical as that above described for Figures I to IV inclusive, but differs in structure to the extent of providing a propeller hub that may be adapted for use on the conventional propeller shaft. To this end an inner externally threaded or spiral tracked member 40, is provided, with a tapered opening for receiving the conventional propeller shaft 41 and rigidly fixed thereto by means of splines 42. It can readily be seen that the shaft 41 and member 40 consists of nothing more than the shaft 10 above described; however, this is a very important feature of the invention, as there is a commercial demand for propeller hubs for use with the conventional propeller shaft. This embodiment further differs from that above described, in that a plurality of centrifugal means 43, pivotally mounted on the member 21, and provided with an arm 44 for cooperating with the inner surface of the propeller hub 11, in such a manner as to render the torsion of the blades negative during operation of the propeller. The action of centrifugal weights is well known and may here be employed in place of the yielding means 33 above described. This embodiment further differs from that above in the adjustable rack members 23, whereby upon moving the rack to the left or right with respect to members 21 and 22, the angle through which the propeller blades are varied may be shifted to any desired position. This is an important feature and renders it possible to employ a standard blade with crafts requiring propellers of greater or less pitch. The means for shifting the rack is here illustrated by threaded means 45, however it is to be understood that any means that will permit the shifting of the rack does not in any way impair the novelty of the idea of shifting the angle through which the propeller blades may be varied, whereby standard blades may be employed for different operating requirements.

It is here pointed out that while a novel manner of connecting the propeller blades with the hub is diagrammatically illustrated and described, it is to be understood that the propeller blades may be mounted within the propeller hub by any suitable means that will provide for oscillatory movement of the blades with respect to the hub. Here again, while the yielding means, 29 and 33 are illustrated as springs, any suitable means that will accomplish the same result may be employed without departing from the spirit of the invention, also the manner in which the yielding means are mounted may be changed, such as providing adjusting means for increasing or decreasing the strength of the springs, and while the present springs are maintained in their proper position by means of stop members, 32—46, supporting the inner ends of springs 29 and 33 respectively, and wells 47 and 48 provided in the inner face of the hub 11 for receiving the outer ends of the springs 29 and 33 respectively, it is to be understood that any suitable means of supporting or replacing such springs may be employed without departing from the spirit of the invention, and here again, it is emphasized that the drawings in their entirety are purely diagrammatic and are for the purpose of illustration only, and are not intended as a detailed definition of the invention.

The operation of the invention is as follows:
When it is desired to take-off, the pilot gives the engine the desired throttle, the resulting driving torque of the propeller shaft 10 is directly applied to the hub 11, the resistance set up by the latter causes the hub to move rearwardly of the shaft 10 along the spiral track against the yielding means 29, and consequently the pitch of the blades is instantly reduced, reducing the external load on the engine and permitting it to attain the desired speed quickly. The value of this result is well recognized by experienced pilots, such value consisting in quick take-off, maintenance of proper motor speed during climbing and like maneuvers; on the other hand, should the plane rise to a great altitude where the air is rarefied, the amount of driving torque of the propeller shaft required to drive the propeller a given speed is reduced, therefore, the proportioned yielding means 29 will instantly urge the hub forward along the spiral track or threads, whereby the pitch of the propeller blades is instantly increased to correspond with the density of the surrounding medium; further, upon cutting the motor to descend, the pitch of the propeller blades is increased to its maximum instantly, due to the yielding means 29 and the inertia stored in the propeller blade will cause the hub to travel forward along the spiral track 18 to its outermost position providing maximum propeller breaking power.

Many important features are provided by the present simple and rugged structure, such as its compactness, few parts, its instant reaction to the motor power, the reduction of propeller overhang during high driving torque of the propeller shaft, the inherent sensitiveness of the various parts to respond to the action of associated parts, the spiral track which permits the hub to move longitudinally of the shaft with comparatively no resistance, the free and easy manner in which the parts are designed to produce a superior mechanism, and the very small development cost necessary to produce a much needed commercial product.

While the invention is described in connection with an aircraft propeller, it is obvious that the same may be employed with any type of a propeller, and while only two embodiments of the invention have been illustrated and described, it will be apparent to those skilled in the art that other changes, modifications, and substitutions may be made without departing from the spirit and scope of the invention, as defined by the appended claims.

What I claim is—

1. In a variable pitch propeller having a driven shaft, a hub drivably connected thereon but relatively movable thereof in response to the driving torque of said shaft, said hub having blades turnably mounted therein, and means associated with said shaft, hub, and blades, and separate from said drivable connection for varying the pitch of the blades, said means being actuated by movement of the hub relative to the shaft due to the driving torque of the latter.

2. In a variable pitch propeller including, a propeller shaft, a source of power for driving said shaft, a propeller hub drivably connected to said shaft and having blades turnably mounted therein, said hub adapted for oscillatory and longitudinal movement with respect to said shaft, and means independent of said drivable connection actuated by said hub for varying the pitch of said blades.

3. In a variable pitch propeller including, a propeller shaft, a source of power for driving said shaft, a propeller hub drivably connected to said shaft and having blades turnably mounted therein, said hub adapted for simultaneous oscillatory and longitudinal movement with respect to said shaft, and means separate from said drivable connection and actuated by said hub during said longitudinal movement thereof for varying the pitch of said blades.

4. In combination with a propeller shaft having a spiral guide thereon, of a propeller hub disposed on said shaft having a spiral guide therein adapted to cooperate with the spiral guide on said shaft for causing said hub to move longitudinally of said shaft during relative rotation thereof, propeller blades turnably mounted in said hub, means associated with said hub and blades for turning said blades and decreasing the pitch thereof when the hub moves longitudinally of said shaft in response to the torque of the latter.

5. In combination, a propeller shaft having a spiral track thereon, a hub frame mounted on said shaft and adapted for oscillatory movement thereof, a hub disposed on said shaft having a spiral track therein adapted to cooperate with the spiral track on said shaft, whereby upon relative rotation of said hub with respect to said shaft the hub is caused to move longitudinally of said frame, blades turnably mounted in said hub, means for biasing said hub toward the outer end of said frame, and means associated with said shaft, hub, hub frame, and blades for automatically varying the pitch of said blades in response to the longitudinal movement of said hub along said frame.

6. In a variable pitch propeller, including a propeller shaft, a propeller hub drivably connected to said shaft and movable with respect thereto, said hub having blades turnably mounted therein, means separate from said drivable connection for turning said blades for decreasing the pitch thereof during torque responsive movement of said hub in one direction with respect to said shaft, and turning said blades for increasing the pitch thereof during movement of said hub in the opposite direction with respect to said shaft and resilient means for moving said hub in said opposite direction.

7. In a variable pitch propeller, a propeller shaft having a spiral track thereon, a hub frame having a toothed rack thereon mounted on said shaft and adapted for oscillatory movement thereof, a hub disposed on said shaft having a spiral tracked opening therein for receiving said shaft and cooperating with the spiral track on said shaft, a longitudinal opening in said hub for receiving said toothed rack, a blade turnably mounted in said hub having a pinion on the inner end thereof meshing with said rack, and means for yieldingly urging said hub towards its outermost position of said rack, whereby upon applying driving torque to said shaft the cooperating spiral tracks tend to move the hub rearwardly against the tension of said yielding means along said frame and shaft and during which time the said pinion meshing with said rack will cause said blade to turn about its longitudinal axis.

8. In a variable pitch propeller, a propeller shaft having a spiral track thereon, a hub frame having a plurality of toothed racks thereon mounted on said shaft and adapted for oscillatory movement thereof, a hub disposed on said shaft having a spiral tracked opening therein for receiving said shaft and cooperating with the spiral track on said shaft, a plurality of longitudinal openings in said hub for receiving said toothed racks, a plurality of blades turnably mounted in said hub having pinions on the inner ends thereof adapted to mesh with said racks, and means for yieldingly urging said hub towards its outermost position of said hub frame whereby upon applying driving torque to said shaft the cooperating spiral tracks tend to move the hub rearwardly against the tension of said yielding means along said frame and shaft and during which time the said pinions meshing with said racks will cause said blades to turn about their longitudinal axes.

9. In a variable pitch propeller, a shaft, a hub frame having rack members thereon, a hub, blades turnably mounted in said hub having pinions on the inner ends thereof meshing with said rack members, a source of power for supplying driving torque to said shaft, means for preventing longitudinal movement of said frame along said hub and permitting relative rotary movement thereof, means for causing relative longitudinal and rotary movement of said hub along said shaft in response to the driving torque of said shaft, means for permitting longitudinal movement of said hub along said frame and preventing relative rotary movement therebetween, means for urging said hub towards its outermost position on said shaft, means for negativing the torsional forces of said blades during the revolving thereof, whereby upon applying driving torque to said shaft the pinions carried by the hub are moved rearwardly along their respective racks causing simultaneous turning of said blades about their longitudinal axes in accordance with the driving torque of said shaft.

10. In an automatic variable pitch propeller including a propeller shaft, a propeller hub having blades thereon, a propeller frame having a rack thereon, means for preventing longitudinal movement of said rack with respect to said shaft, and means for causing longitudinal movement of said hub with respect to said rack, the last said means dependent upon relative rotary movement of the said hub with respect to said shaft.

11. In a variable pitch propeller, a shaft, a hub frame, rack members carried by said frame, a hub, blades turnably mounted in said hub, pinions on the inner ends of said blades meshing with said rack members, a source of power for supplying driving torque to said shaft, said hub frame being secured against longitudinal movement along said shaft but free to rotate relatively thereto, means for urging said hub towards its outermost position on said shaft, means for causing relative longitudinal and rotary movement of said hub with respect to said shaft in response to the driving torque of said shaft, whereby upon applying torque to said shaft the pinions carried by the blades are moved rearwardly along their respective racks causing simultaneous turning of said blades about their longitudinal axes in accordance with the driving torque of said shaft, and means for adjusting said rack members with respect to said frame for shifting the angle through which said blades are adapted to turn.

12. In a variable pitch propeller, a shaft having a spiral track thereon, a hub frame mounted on said shaft and adapted for oscillatory movement thereof, a plurality of rack members mounted on said frame, a hub disposed on said shaft and having a spiral track opening therein for cooperating with the spiral track on said shaft, a plurality of openings in said hub for receiving said rack members, a plurality of blades turnably mounted in said hub and having pinions on the inner ends thereof adapted to mesh with said rack members, means for yieldingly urging said hub toward its outermost position whereby on applying driving torque to said shaft the cooperating spiral tracks tend to move the hub rearwardly against said yielding means along said frame and shaft and during which time the said pinions and racks cause said blades to turn about their longitudinal axes, and means for shifting said rack members whereby the angle through which the blades are turned may be shifted for increasing or decreasing the maximum pitch of said blades.

HARRISON BATES.